United States Patent
Goel et al.

(10) Patent No.: US 9,021,587 B2
(45) Date of Patent: Apr. 28, 2015

(54) DETECTING SOFTWARE VULNERABILITIES IN AN ISOLATED COMPUTING ENVIRONMENT

(75) Inventors: Nitin Kumar Goel, Bothell, WA (US); Kenneth D. Johnson, Bellevue, WA (US); Matthew Ryan Miller, Seattle, WA (US); Navin Narayan Pai, Seattle, WA (US); Grzegorz M. Wroblewski, Bellevue, WA (US); Gregory Justice Riggs, Renton, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 33 days.

(21) Appl. No.: 13/283,353

(22) Filed: Oct. 27, 2011

(65) Prior Publication Data

US 2013/0111587 A1    May 2, 2013

(51) Int. Cl.
  *G06F 21/00*    (2013.01)
  *G06F 21/57*    (2013.01)
(52) U.S. Cl.
  CPC ........ *G06F 21/577* (2013.01); *G06F 2221/034* (2013.01)
(58) Field of Classification Search
  CPC .............................. G06F 21/00; G06F 21/577
  USPC .......................................................... 726/23
  See application file for complete search history.

(56) References Cited

U.S. PATENT DOCUMENTS

| | | | |
|---|---|---|---|
| 5,359,659 A * | 10/1994 | Rosenthal ........................ | 726/24 |
| 6,681,348 B1 * | 1/2004 | Vachon ............................. | 714/45 |
| 7,346,922 B2 * | 3/2008 | Miliefsky .......................... | 726/3 |
| 8,321,936 B1 * | 11/2012 | Green et al. ..................... | 726/23 |
| 2002/0116635 A1 * | 8/2002 | Sheymov ........................ | 713/200 |
| 2003/0131152 A1 * | 7/2003 | Erlingsson ..................... | 709/328 |
| 2003/0135791 A1 * | 7/2003 | Natvig ............................. | 714/38 |
| 2004/0133444 A1 * | 7/2004 | Defaix et al. ..................... | 705/1 |
| 2005/0172305 A1 * | 8/2005 | Baumberger ................. | 719/327 |
| 2005/0235007 A1 * | 10/2005 | Abali et al. ................... | 707/202 |
| 2009/0198484 A1 * | 8/2009 | Christensen et al. ........... | 703/22 |
| 2009/0210422 A1 * | 8/2009 | Chen et al. ........................ | 707/9 |
| 2009/0222922 A1 * | 9/2009 | Sidiroglou et al. ............. | 726/23 |
| 2009/0319435 A1 * | 12/2009 | Little et al. ...................... | 705/76 |
| 2011/0258692 A1 * | 10/2011 | Morrison et al. ............... | 726/11 |

OTHER PUBLICATIONS

Du et al., Testing for Software Vulnerability Using Environment Perturbation, Jun. 2000, IEEE Proceedings of the International Conference on Dependable Systems and Networks, DSN 2000, pp. 603-612.*

* cited by examiner

*Primary Examiner* — Taghi Arani
*Assistant Examiner* — Kenneth Chang
(74) *Attorney, Agent, or Firm* — Dan Choi; Sade Fashokun; Micky Minhas

(57) ABSTRACT

The subject disclosure is directed towards detecting software vulnerabilities in an isolated computing environment. In order to evaluate each input submission from an external computer, a plurality of tasks are automatically generated for execution on one or more computing units running within the isolated computing environment. Various configurations of the one or more computing units are defined in which each computing unit executes the plurality of tasks. A report is produced comprising results associated with such an execution.

13 Claims, 6 Drawing Sheets

DETECTING SOFTWARE VULNERABILITIES IN AN ISOLATED COMPUTING ENVIRONMENT

BACKGROUND

It has become increasingly important for developers to create robust software programs, not only in the face of sophisticated security threats, but also to compete with similar programs. Software vulnerabilities, whether benign software code defects (e.g., bugs) or exploitable software code, may cause a loss in revenue as well as market share. For these reasons, the developers continually work at detecting and mitigating both known and unknown software vulnerabilities as soon as possible.

Many security threat detection systems utilize signature-based techniques that fail to recognize variants. Furthermore, these systems are reactive and wait for the security threat to be recognized before a security expert is able to build an identifying signature. Because there is no generic way to match the security threat back to the specific software vulnerability being exploited, a custom signature is written for each known software vulnerability.

Unknown software vulnerabilities present an even more difficult problem to detect and mitigate. Some developers deploy various computing environments to the Internet that are deliberately unsecure (commonly referred to as "Honey-Pots") for the purpose of catching infections as quickly as a security threat is released. These computing environments typically hook the operating system and use heuristics to detect that an infection has occurred. Such a heuristic approach, however, tends to noisy and may be easily circumvented. Therefore, conventional software vulnerability detection systems are unable to measure up to the complexity and adaptability of current software threats.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards detecting software vulnerabilities in an isolated computing environment. In one aspect, the isolated computing environment comprises a system of computing units in which each unit is configured using a different combination of computing resources, software program versions, operating system versions/settings and/or the like. Using different combinations ensures the detection of a software vulnerability that is specific to a certain configuration. For example, a software threat or exploit may only infect one version of a software program running a specific operating system. In another aspect, a computing unit is configured such that the software threat fails and causes malicious software code execution to crash or fail, which permits precise identification of the exploited software vulnerability.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards detecting software vulnerabilities within an isolated computing environment. In one exemplary implementation, the isolated computing environment comprises computing units (e.g., virtual machines and/or physical computers) that are segregated from external computers and the Internet using dedicated firewalls. The computing units are permitted to communicate with the Internet exclusively through proxy servers that may be located in different geographic regions. Furthermore, files and/or URLs are submitted to the isolated computed environment for evaluation only through other proxy servers. Such segregation enables the computing units to allocate an efficient amount of resources and system instrumentation for successful software vulnerability detection.

In one exemplary implementation, the isolated computing environment includes a detection system for managing the computing units. The detection system configures each computing unit with various security tools as well as other scanning programs similar to those found at an actual end-user computer. In another exemplary implementation, the detection system provisions the computing units with different combinations of program versions, operating systems and capacities of computing resources in order to evaluate a file or URL in a variety of configurations. The detection system automatically generates tasks, such as simulated end-user tasks, for performing the evaluation. Some of these tasks use a security tool to alter built-in operating system settings in order modify run-time conditions and behavior.

In another exemplary implementation, the detection system is designed to cause a process crash or failure when executing faulty or malicious software code instead of permitting such execution. For example, the detection system may apply a security amplifying technique to harden a program and/or an execution environment. The security amplifying technique may be also be applied to detect local exploits by hardening an operating system kernel and/or other more privileged processes/services rather than or in addition to a user mode program. The detection system may also monitor computer resource usage of the program in order to adjust the security amplifying technique.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and detecting software vulnerabilities in general.

Figure 1:
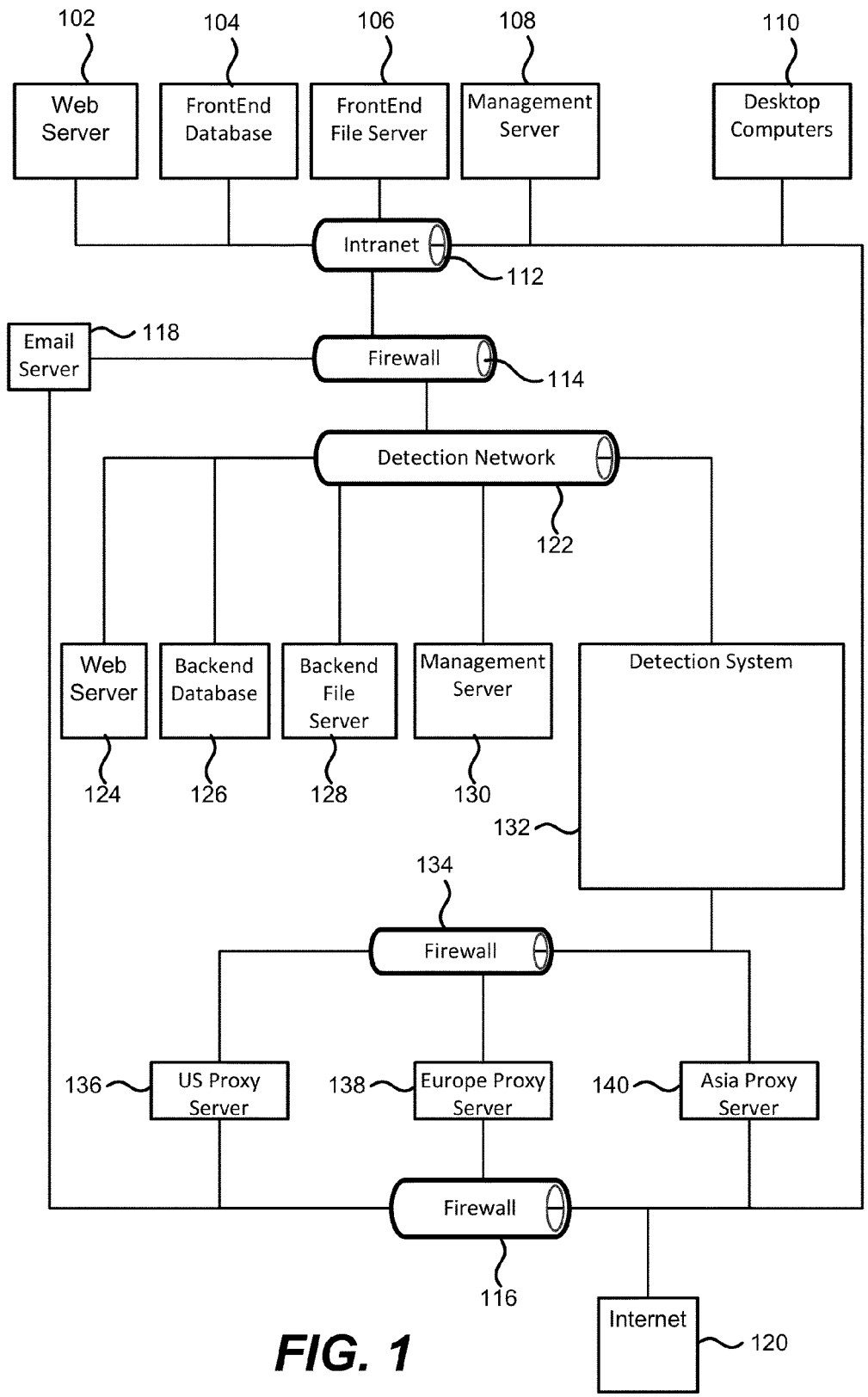
FIG. 1 is a block diagram illustrating an exemplary system for detecting software vulnerabilities using an isolating computing environment according to one example implementation.

FIG. 1 is a block diagram illustrating an exemplary system for detecting software vulnerabilities using an isolating computing environment according to one example implementation. As described herein, a plurality of networking domains form the exemplary system.

In one exemplary implementation, exemplary components of one networking domain include a web server 102, a frontend database 104, a frontend file server 106, a management server 108 and a plurality of desktop computers 110. The exemplary components operate within a networking domain known as an Intranet 112 (i.e., a corporate network). These exemplary components couple to other networking domains via a firewall 114 and/or a firewall 116. The firewall 114 may include proxy servers that facilitate data communications between the networking domains. For example, an email server 118 communicates with the exemplary components via a proxy server and the Intranet 112. The firewall 116 enables communication between the Internet 120 and a detection network 122.

In one exemplary implementation, the detection network 122 includes a networking domain in which the isolated computing environment is comprised. Exemplary components of this networking domain include a web server 124, a backend database 126, a backend file server 128, a management server 130 and a detection system 132. As described herein, the plurality of dedicated proxy servers segregate the exemplary components from the other networking domains. Via the proxy server 116, for example, the desktop computers 110 communicate input submissions (e.g., files, Uniform Resource Locators (URLs) and/or the like) to the detection system 132.

Exemplary components of the detection system 132 automatically generate and execute various tasks on the input submissions. The various tasks identify vulnerabilities within software programs running on physical computers and/or virtual machines within the isolated computing environment. For example, the various tasks may include scanning files and downloaded content from Uniform Resource Locators (URLs) submitted by users or automated programs outside the detection network 122. Such files or URLs are submitted using various services, such as e-mail based submission, web based submission (interactive or programmatic) or a custom protocol-based submission.

In order to access Internet resources hosted by the URLs, the detection system 132 utilizes a physically separated network connection, such as a dedicated firewall 134, to communicate with proxy servers across different geographical locations, which may be located in the United States, Europe and Asia. If, for example, the URL has to be opened in a browser or a document file has to be downloaded from an external website, a virtual machine within the detection system 132 uses one of these proxy servers, such as a US proxy server 136, Europe proxy server 138 and Asia proxy server 140, to facilitate access to the Internet 120 from geographically different egress points. Each proxy server is fully capable of utilizing communication protocols and interfaces within the Internet 120 and retrieving content from a web server that corresponds to the URL.

In one exemplary implementation, the detection system 132 provisions and launches one or more virtual machines each with a set of computing resources sufficient to perform the automatically generated tasks. The one or more virtual machines may be further configured with different versions of a program for processing the input submission and/or different operating systems. The proxy servers behind the firewall 134 cannot be accessed from the Internet or from the detection network 132 other than through these virtual machines. Hence, the proxy servers are the only computers permitted to directly and physically access to the Internet 120 on behalf of these virtual machines.

In one exemplary implementation, for each file to be evaluated, the detection system 132 may perform various tasks. As an example, the detection system 132 may determine whether the file is an archive wrapping one or multiple other files, in which instance the detection system 132 unwraps these files and applies a hardening technique to each file separately. The detection system 132 may also decide whether the archive can be unwrapped using stored password or one that is provided by a user. The detection system 132 may also examine file contents or use portions of the file name to determine an actual file format and create a list of suitable tasks to be executed. The detection system 132 may also submit a list of tasks for accessing web service or other API server through the firewall 134.

Furthermore, the detection system 132 may store the input submission as well as any associated information in the backend database 126. The detection system 132 may periodically inquire or wait for confirmation that the execution of the automatically generated tasks has completed. Upon completion of these tasks, the detection system 132 produces report comprising task results, which are arranged into a user-friendly and/or application-friendly form. The detection system 132 may store such a report or any portion thereof in the backend database 126 in preparation for delivery through any communication protocol, such as e-mail, a web service interface or a custom communication protocol. If the task results indicate a new file type/format that should be selected for further screening, the detection system 132 repeats each scanning process and stores task dependency information in the backend database 126.

In one exemplary implementation, for each URL to be evaluated, the detection system 132 may perform various simulated end-user tasks based on a heuristic analysis of the input submission. As an example, if the URL is a source of a downloadable file, the detection system 132 may create a list of tasks for a corresponding file type. Hence, the detection system 132 performs a same set of tasks as those that would be performed if the downloaded file were submitted by users of the Intranet 112. The detection system 132 may crawl derived URLS from a starting point of the URL as a pre-submission task and retrieve any linked content. The detection system 132 may perform supplemental tasks on the derived URLs as well as any files downloaded from these URLs. The detection system 132 may also define a set of egress points for accessing the linked content based on the heuristic analysis.

The tasks executed by the detection system 132 include opening a submitted file in an application that is capable of processing a corresponding file type. The detection system 132 may also scan the submitted file using one or more static analysis tools of binary or textual file content, file structure or other file properties. Alternatively, the submitted file may be scanned using a tool for detecting malicious software code that is unrelated to file structure or type. The detection system 132 may adjust the task by modifying operating system settings in order to cause malicious software code within the input submission to fail to execute and to crash an operating system process or thread. With respect to a submitted URL, the detection system 132 may instruct one of the proxy servers behind the firewall 134 to open the URL in a web browser application and download content.

Figure 2:
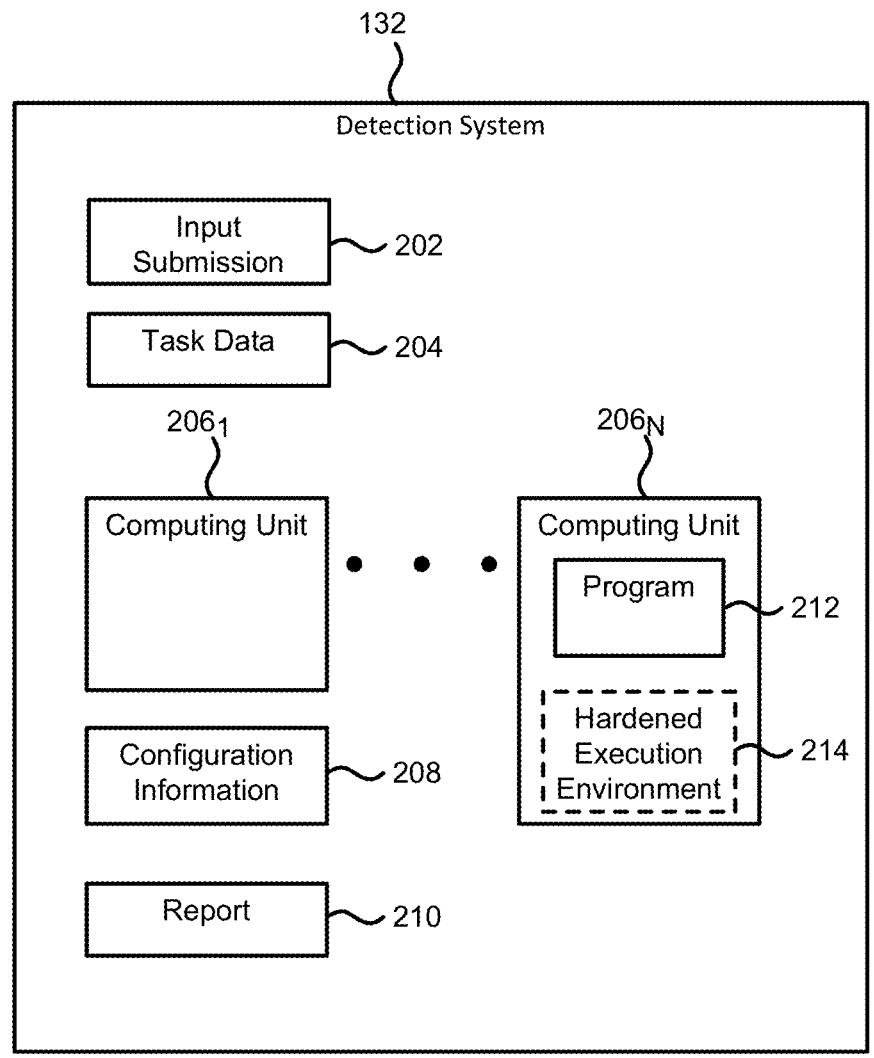
FIG. 2 is a block diagram illustrating an exemplary isolating computing environment embodied by a detection system for software vulnerabilities according to one example implementation.

FIG. 2 is a block diagram illustrating an exemplary isolating computing environment embodied by the detection system 132 for software vulnerabilities according to one example implementation. The detection system 132 receives an input submission 202 from the external computer, such as a desktop computer within a corporate network. In order to examine the input submission 202 for software vulnerabilities, the detection system 132 automatically generates tasks, which are stored in task data 204, and also defines various configurations for a plurality of computing units 206, which are stored as configuration information 208, that execute the automatically generated tasks. The detection system 132 produces a report 210 summarizing results from the execution of the tasks.

In one exemplary implementation, the plurality of computing units 206 include physical computers as well as virtual machines. The detection system 132 creates the isolated computing environment by preventing data communications between the plurality of computing units 206 and any external computer as well as the Internet except through a proxy server as described herein. Furthermore, the detection system 132 provisions computing resources to the virtual machines, which are launched on some of the physical computers.

In one exemplary implementation, the configuration information 208 includes combinations of differentiators for each computing unit 206, such as application versions, hardware attributes, operating system settings that change application run-time conditions, security amplification techniques (i.e., hardening) that modify run-time environment to evade common exploitation techniques, security tools that perform static analysis for security relevant properties of the submitted data and/or the like. For example, the detection system 132 may alter an underlying address space for one computing unit configuration while leaving an address space of another computing unit configuration unchanged in order to determine behavioral differences when opening a file or downloading content associated with a URL.

Given the input submission 202, such as a file or URL, and a computing unit configuration upon which to test the input submission 202, the detection system 132 may utilize a program 212 to open the input submission 202 for evaluation. In one exemplary implementation, the program 212 operates in a typical (i.e., non-hardened) execution environment. Optionally, the detection system 132 may utilize a version of the program 212 operating in a hardened execution environment 214 that is configured to or modified to causes exploits to fail in a detectable manner. After opening the input submission 202 comprising malicious software code, the hardened execution environment 214 may cause a process crash that would not have occurred if the input submission 202 included legitimate software code.

By way of example, the detection system 132 creates the hardened execution environment 214 using various combinations of the following security amplifying techniques: enabling vulnerability mitigations such as Data Execution Prevention and Address Space Layout Randomization (ASLR), changing the way a memory heap behaves to detect memory corrupting faulty software code (e.g., by enabling Page Heap), pre-reserving sections of the hardened execution environment 214 address space, inserting checks or hooks to detect anomalous program state and/or the like (e.g., checks for stack pivoting).

After opening the input submission 202 within the hardened execution environment 214, the detection system 132 determines whether any of the security amplifying techniques is triggered using various mechanisms according to one exemplary implementation. The various mechanisms may include attaching a debugger and monitoring for unhandled exceptions. One exemplary mechanism may include monitoring network traffic for unexpected or suspicious activities. As another example, the detection system 132 may register a vectored exception handler or unhandled exception filter in an operating system process or thread for the program 212 running within the hardened execution environment 214. As yet another example, the detection system 132 inserts hooks into the operating system process that returns anomalous events.

The detection system 132 may monitor computer resource utilization within the hardened execution environment 214. Some of the computer resources are specifically affected by a particular security amplifying technique, such as memory usage when Page Heap is enabled. If the program 212 exhausts any monitored computer resource without failing or crashing because of the particular security amplifying technique, then the detection system 132 reconfigures the hardened execution environment 214 using a different combination of security amplifying techniques. If the program 212 fails because of the particular security amplifying technique, there is a strong likelihood of one or more software vulnerabilities being triggered by the input submission 202.

In response to a process crash or failure, the detection system 132 compares a complete or partial call stack with one or more previous call stacks to determine whether the process crash is caused by a new software vulnerability, such as faulty software code (e.g., faulty user mode software code), or known one. If there is a previously known software vulnerability, then the detection system 132 uses the matching call stack to make a precise identification. For example, if the matching call stack corresponds with known faulty software code (i.e., a software bug) within a version of MICROSOFT® Excel™, the detection system 132 returns a common name for such code.

According to another implementation, the detection system 132 determines whether the input submission 202 includes benign or malicious data or software code. Malicious software code attempts to exploit known or unknown software vulnerabilities. For example, the detection system 132 examines computer memory of indicia of shellcode. Such an examination may be performed online or offline via a crash dump. The detection system 132 may repeat execution of the task data 204 without using the hardened execution environment 214 or without monitoring for successful exploit indicia, such as anomalous files being dropped, network input/output (I/O) and/or operating system processes being created.

In one exemplary implementation, the detection system 132 may detect local privilege escalation exploits by applying a security amplification technique on a kernel mode portion of the hardened execution environment 214 instead of a user mode portion. The security amplification technique may alter a kernel mode address space and/or one or more operating system kernel components in order to induce a failure or process crash when the program 212 launches. For example, executing faulty kernel mode software code and/or privileged software code may cause a CPU fault to be generated. Such a security amplification techniques may also include, but is not limited to: enabling mitigations for kernel mode software vulnerabilities, such as a software implementation of Supervisor Mode Execution Protection (SMEP), and inserting checks/hooks to detect known privilege escalation techniques, such as UAC bypasses.

Figure 3:
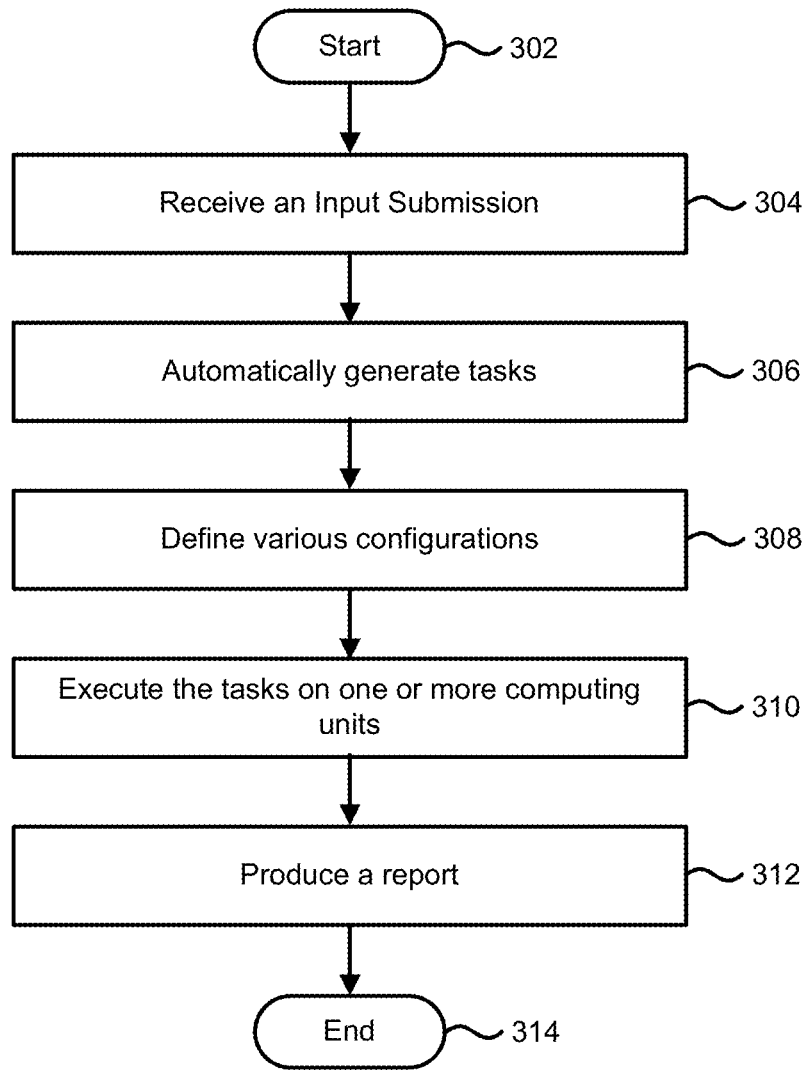
FIG. 3 is a flow diagram illustrating exemplary steps for detecting software vulnerabilities using an isolating computing environment according to one example implementation.

FIG. 3 is a flow diagram illustrating exemplary steps for detecting software vulnerabilities using an isolating computing environment according to one example implementation. The exemplary steps commence at step 302 and proceed to step 304 at which the detection system 132 receives an input submission. In one exemplary implementation, the detection system 132 resides within the isolated computing environment to which an external computer communicates a file or URL for evaluation. Using one or more firewalls, the detection system 132 segregates one or more computing units from the external computer. Hence, operations performed by the one or more computing units may not be able to affect the external computer or transmit data to the Internet without proxy servers.

Step 306 is directed to automatically generating tasks for testing the input submission. As described herein, these tasks may include opening a file using a program and/or scanning file contents for malicious code and/or structural anomalies. If the program crashes or behaves abnormally during file operations, the program most likely includes faulty (user mode) software code. In one exemplary implementation, the detection system 132 may also amplify security capabilities (i.e., hardening) of the program and wait for a process crash or failure, which indicates a presence of the malicious or faulty software code within the program.

Step 308 refers to defining various configurations of one or more computing units within the isolated computing environments. In one exemplary implementation, the one or more computing units include physical computers and/or virtual machines upon which the automatically generated tasks are executed. By provisioning each computing unit with different sets of computing resources as well as program versions and operating system settings, there is a higher likelihood of identifying known and/or unknown software vulnerabilities. Each computing unit configuration may correspond with a specific file type.

Step 310 represents executing the tasks on the one or more computing units. In one exemplary implementation, the detection system 132 alters the program and/or an underlying operating system in order to cause an exploit (e.g., malicious software code) that is within the file or downloaded content, to fail or a hosting computing unit to crash. Step 312 refers to producing a report comprising results from executing the tasks. Accordingly, the report may indicate the failure and the associated exploit. Step 314 terminates the steps described in FIG. 3.

Figure 4:
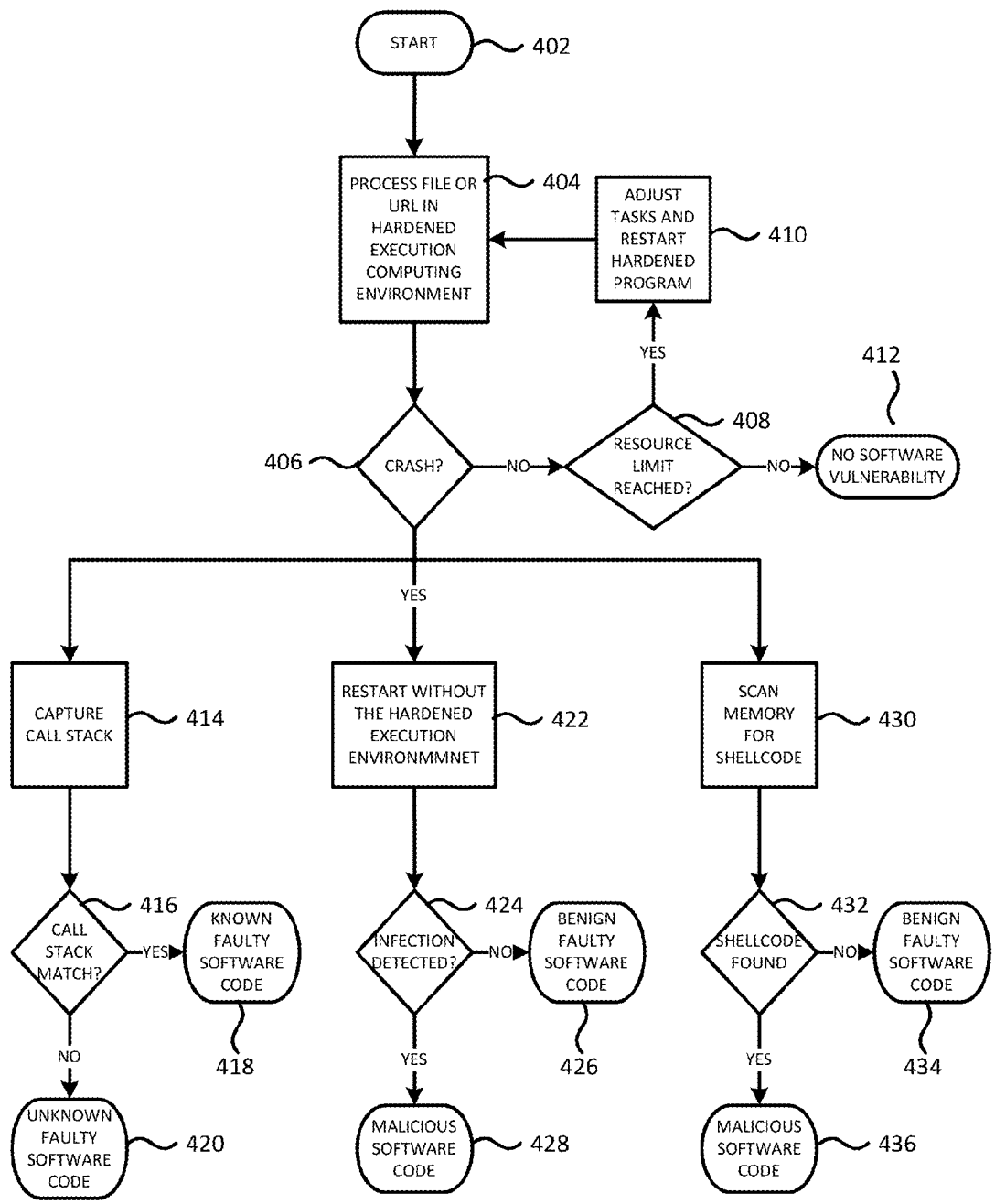
FIG. 4 is a flow diagram illustrating exemplary steps for opening an input submission in a program running in a hardened execution environment according to one example implementation.

FIG. 4 is a flow diagram illustrating exemplary steps for opening an input submission in a program running in a hardened execution environment according to one example implementation. The exemplary steps commence at step 402 and proceed to step 404 at which the detection system 132 processes a file or a URL in the program that is running within a computing unit. As described herein, the detection system 132 forms a portion of an isolated computing environment.

By way of example in one exemplary implementation, consider that the program is a version of MICROSOFT® Excel running in an execution environment to which the detection system 132 applied a security amplifying technique. For example, the detection system 132 may have altered a memory address space to cause a crash when the program processes a spreadsheet file comprising malicious software code. The detection system 132 deploys the program on a virtual machine that is configured with a certain operating system. In another exemplary implementation, the detection system 132 may provision other virtual machines with different operating systems and/or different versions of MICROSOFT® Excel. Some execution environments for these virtual machines may be hardened with different security amplification techniques or the same technique as the hardened execution environment. Using different combinations of machine configurations increases the chances of a failure or crash in response to a software vulnerability.

Step 406 determines whether a process crash or failure occurred in the computing unit. If the computing unit did not crash, the steps described in FIG. 4 proceeds to step 408. If there is a process crash, the steps described in FIG. 4 proceeds to step 414 where the detection system 132 performs post-processing activity, such as monitoring of one or more computing resource for indicia of software vulnerabilities (e.g., faulty or malicious software code) according to one exemplary implementation.

Step 408 is directed to determining whether the program running in the now hardened execution environment reached a computing resource limit. If the program met or exceeded the computing resource, the steps described in FIG. 4 proceeds to step 410. Step 410 is directed to adjusting tasks and restarting the program. After performing step 410, the steps described in FIG. 4 returns to step 404. If the program did not exceed any computing resource, the steps described in FIG. 4 proceeds to step 412. Step 412 represents the detection of no software vulnerability or other bug associated with the file or downloaded content from the URL. After performing step 412, the steps described in FIG. 4 terminate.

Step 414 is directed to capturing a call stack. The detection system 132 compares the captured call stack with known call stacks. Step 416 represents a determination as to whether there is the captured call stack matches one or more of the known call stack. If the detection system 132 identifies a matching call stack, the steps described in FIG. 4 proceeds to step 418 at which the detection system 132 determines that there is known, faulty software code within the program. If the detection system 132 does not identify a match for the captured call stack, the steps described in FIG. 4 proceeds to step 420 at which the detection system 132 determines that there is unknown, faulty software code within the program. Additional analysis to determine the fault may be performed. According to one exemplary implementation, after performing step 418 or step 420, the detection system 132 proceeds to step 422 or, alternatively, the steps described in FIG. 4 terminate.

Step 422 is directed to restarting evaluation of the file or the URL without the hardened execution environment. In one exemplary implementation, the detection system 132 selects another program and proceeds to step 424. Step 424 is directed to a determination as to whether an infection is detected. If there is no infection associated with the file or the URL, the steps described in FIG. 4 proceeds to 426 at which the detection system 132 determines that there is benign, faulty software code within the program. If there is an infection associated with the file or the URL, the steps described in FIG. 4 proceeds to 428 at which the detection system 132 determines that there is malicious software code within the file or the downloaded content form the URL. According to one exemplary implementation, after performing step 426 or step 428, the detection system 132 proceeds to step 430 or, alternatively, the steps described in FIG. 4 terminate.

Step 430 is directed to scanning memory for shellcode. Step 432 is directed to a determination as to whether shellcode is found. If there is no shellcode in the memory, the steps described in FIG. 4 proceeds to 434 at which the detection system 132 determines that there is benign, faulty software code within the program, the file and/or the downloaded content. If there is shellcode in the memory, the steps described in FIG. 4 proceeds to 436 at which the detection system 132 determines that there is malicious software code within the file or the downloaded content. According to one exemplary implementation, after performing step 434 or step 436, the detection system 132 terminates steps described in FIG. 4.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 5:
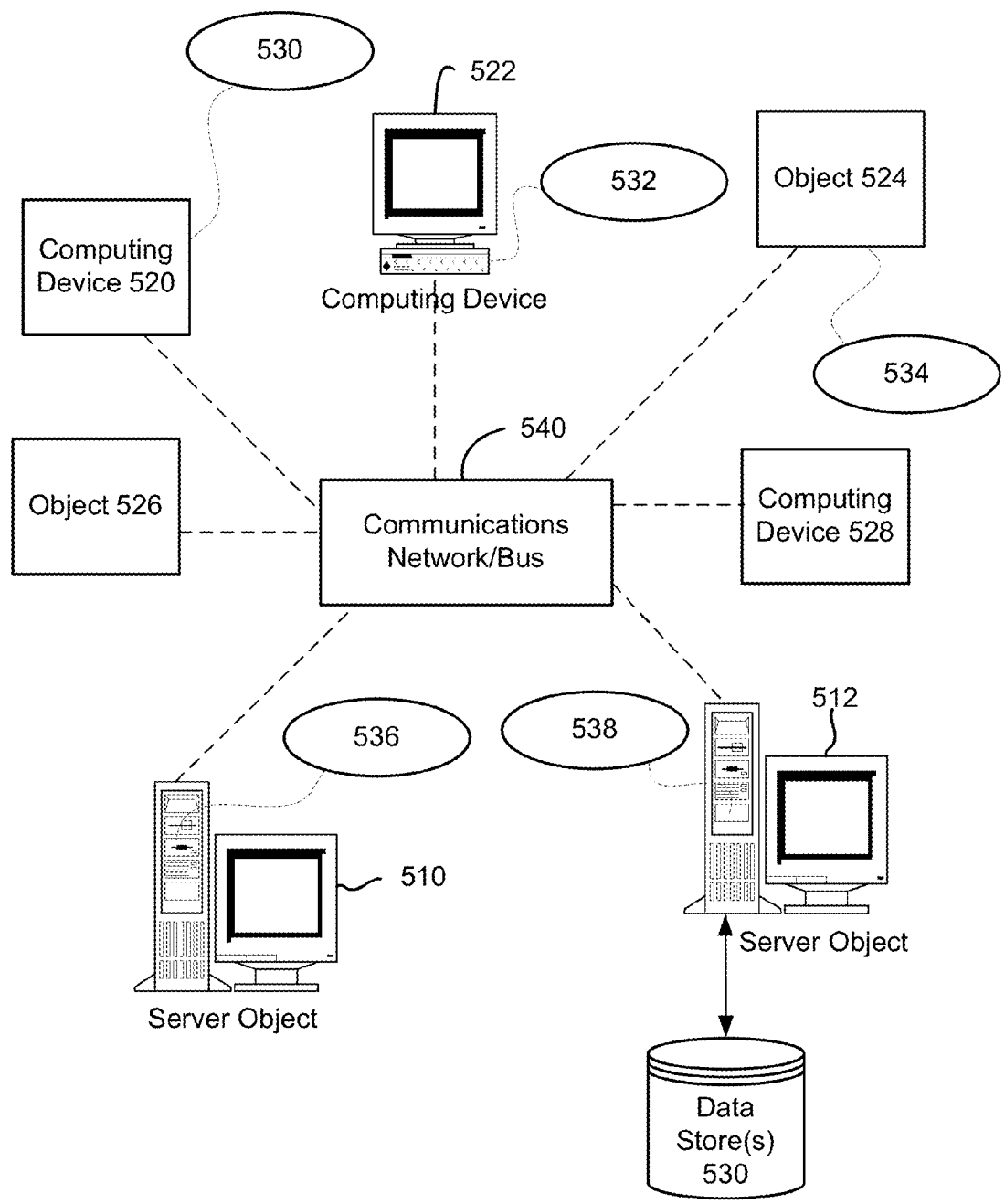
FIG. 5 is a block diagram representing exemplary non-limiting networked environments in which various embodiments described herein can be implemented.

FIG. 5 provides a schematic diagram of an exemplary networked or distributed computing environment. The distributed computing environment comprises computing objects 510, 512, etc., and computing objects or devices 520, 522, 524, 526, 528, etc., which may include programs, methods, data stores, programmable logic, etc. as represented by example applications 530, 532, 534, 536, 538. It can be appreciated that computing objects 510, 512, etc. and computing objects or devices 520, 522, 524, 526, 528, etc. may comprise different devices, such as personal digital assistants (PDAs), audio/video devices, mobile phones, MP3 players, personal computers, laptops, etc.

Each computing object 510, 512, etc. and computing objects or devices 520, 522, 524, 526, 528, etc. can communicate with one or more other computing objects 510, 512, etc. and computing objects or devices 520, 522, 524, 526, 528, etc. by way of the communications network 540, either directly or indirectly. Even though illustrated as a single element in FIG. 5, communications network 540 may comprise other computing objects and computing devices that provide services to the system of FIG. 5, and/or may represent multiple interconnected networks, which are not shown. Each computing object 510, 512, etc. or computing object or device 520, 522, 524, 526, 528, etc. can also contain an application, such as applications 530, 532, 534, 536, 538, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects 510, 512, etc. can be thought of as servers where computing objects 510, 512, etc., acting as servers provide data services, such as receiving data from client computing objects or devices 520, 522, 524, 526, 528, etc., storing of data, processing of data, transmitting data to client computing objects or devices 520, 522, 524, 526, 528, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 540 or bus is the Internet, for example, the computing objects 510, 512, etc. can be Web servers with which other computing objects or devices 520, 522, 524, 526, 528, etc. communicate via any of a number of known protocols, such as the hypertext transfer protocol (HTTP). Computing objects 510, 512, etc. acting as servers may also serve as clients, e.g., computing objects or devices 520, 522, 524, 526, 528, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 6 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 6:
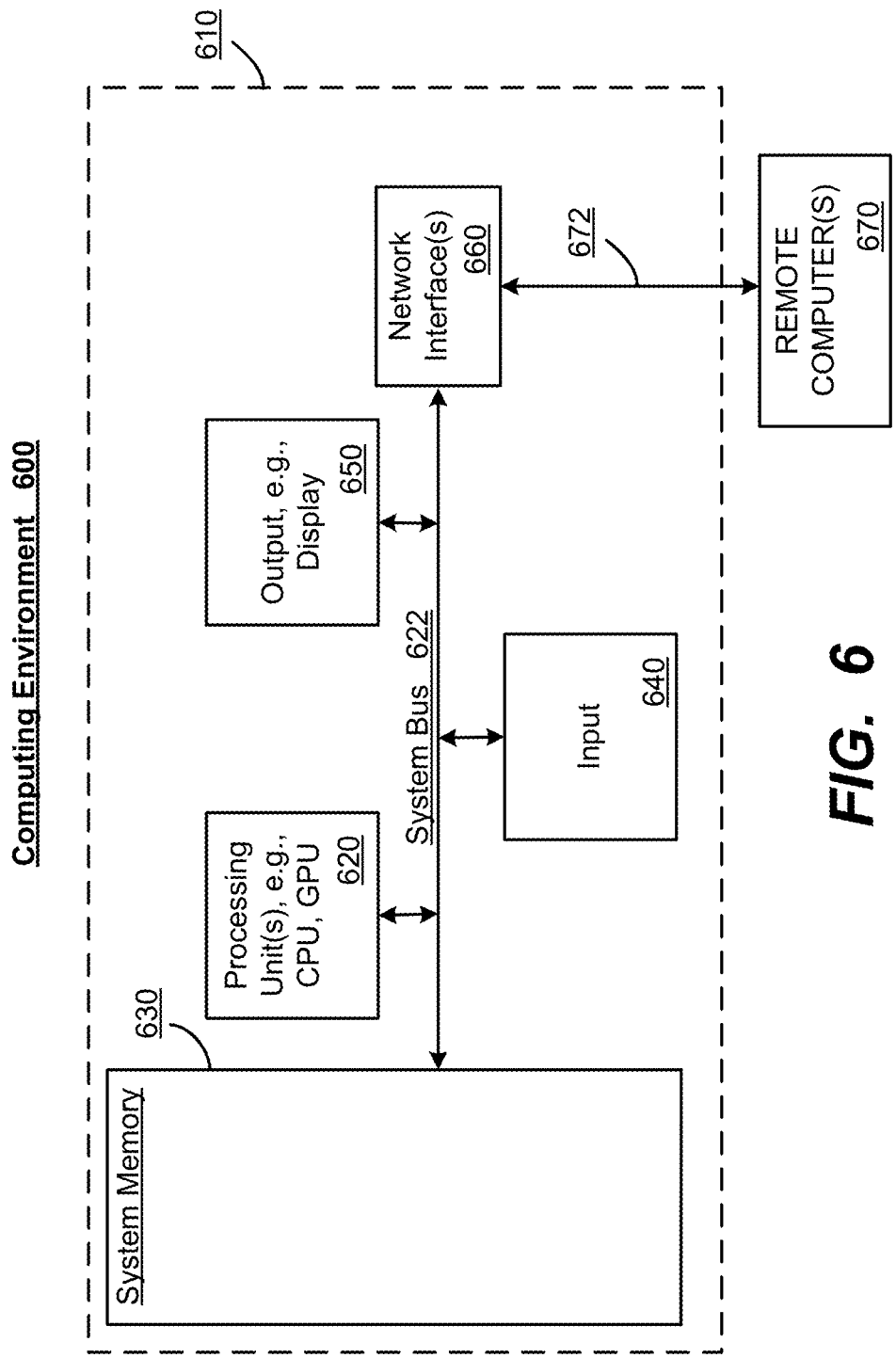
FIG. 6 is a block diagram representing an exemplary non-limiting computing system or operating environment in which one or more aspects of various embodiments described herein can be implemented.

FIG. 6 thus illustrates an example of a suitable computing system environment 600 in which one or aspects of the embodiments described herein can be implemented, although as made clear above, the computing system environment 600 is only one example of a suitable computing environment and is not intended to suggest any limitation as to scope of use or functionality. In addition, the computing system environment 600 is not intended to be interpreted as having any dependency relating to any one or combination of components illustrated in the exemplary computing system environment 600.

With reference to FIG. 6, an exemplary remote device for implementing one or more embodiments includes a general purpose computing device in the form of a computer 610. Components of computer 610 may include, but are not limited to, a processing unit 620, a system memory 630, and a system bus 622 that couples various system components including the system memory to the processing unit 620.

Computer 610 typically includes a variety of computer readable media and can be any available media that can be accessed by computer 610. The system memory 630 may include computer storage media in the form of volatile and/or nonvolatile memory such as read only memory (ROM) and/or random access memory (RAM). By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 672, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
    detecting software vulnerabilities using an isolated computing environment, including automatically generating tasks for evaluating an input submission,
    defining various configurations of one or more computing units that are running within the isolated computing environment, each configuration comprising a set of differentiators,
    altering an underlying operating system to cause a crash when a program comprising faulty software code opens the input submission,
    amplifying security capabilities of at least one computing unit to modify the isolated computing environment, and
    executing the tasks on the one or more computing units to determine behavior differences when testing the input submission on the various configurations including opening the input submission in a hardened execution environment and identifying the faulty software code within the hardened execution environment.

2. The method of claim 1, wherein executing at least one of the tasks causes malicious software code within the input submission to fail.

3. The method of claim 1, wherein executing the tasks further comprises identifying malicious software code within the input submission.

4. The method of claim 1, wherein identifying the faulty software code further comprises identifying at least one of faulty kernel mode software code, faulty user mode software code and faulty privileged software code.

5. The method of claim 1 further comprising modifying the hardened execution environment using one or more security amplification techniques and repeating the executing step.

6. The method of claim 1, wherein defining the various configurations further comprises provisioning a virtual machine with computing resources, a program version and a set of operating system settings.

7. In a computing environment, a system, comprising,
    at least one processor,
    a memory communicatively couples to the at least one processor and including components comprising,
    a detection system configured to identify software vulnerabilities using an isolated computing environment, the detection system further configured to
    segregate one or more computing units from an external computer using a firewall,
    automatically generate tasks for evaluating an input submission on various configurations of the one or more computing units, and while executing the tasks on the one or more computing units in which at least one computing unit comprises an execution environment associated with modifying the isolate computing environment to evade exploitation techniques,
    the detection system further configured to apply a security amplifying technique to harden the execution environment into a hardened execution environment and monitor resources within the one or more computing units for the software vulnerabilities, the hardened execution environment configured to process a crash within the one or more computing units when processing the input submission.

8. The system of claim 7 wherein the input submission comprises a URL.

9. The system of claim 8, wherein the detection system evaluates downloaded content corresponding to the URL.

10. The system of claim 7, wherein the input submission comprises a file.

11. The system of claim 7, wherein the detection system is coupled to proxy servers that are located in different geological regions.

12. A computer-readable storage device having computer-executable instructions, which when executed perform steps, comprising:
    preventing data communications between one or more computing units from communicating with an external computer except for one or more proxy servers;
    configuring the one or more computing units to execute tasks on an input submission from the external computer;
    altering an execution environment of the one or more computing units to modify run-time conditions, monitor for exploit indicia, and cause a crash in response to a software vulnerability;
    executing the tasks using a program that opens the input submission;
    identifying faulty software code within the program based on crash-related data; and
    examining the crash-related data to determine whether the input submission comprises malicious software code.

13. The one or more computer-readable device of claim 12 having further computer-executable instructions comprising: generating simulated end-user tasks based on a heuristic analysis of the input submission.

* * * * *